United States Patent [19]

Casler

[11] 3,783,295

[45] Jan. 1, 1974

[54] OPTICAL SCANNING SYSTEM

[75] Inventor: David Henry Casler, Rochester, Minn.

[73] Assignee: International Business Machines Corporation, Armonk, N.Y.

[22] Filed: Sept. 30, 1971

[21] Appl. No.: 184,994

[52] U.S. Cl. ................................ 250/567, 178/7.6

[51] Int. Cl. ................................ H01j 39/12

[58] Field of Search ............... 250/219 CR, 219 QA, 250/219 FR, 219 DF, 219 DQ, 234, 235; 235/61.11 E; 178/7.6; 350/7, 6; 356/23, 24, 25, 26; 340/146.3

[56] References Cited

UNITED STATES PATENTS

| | | | |
|---|---|---|---|
| 3,360,659 | 12/1967 | Young | 350/7 |
| 3,562,426 | 2/1971 | Lavergne | 178/7.6 |
| 3,495,036 | 2/1970 | Clayton | 178/7.6 |
| 3,456,997 | 7/1969 | Stites | 235/61.11 E |
| 3,413,411 | 11/1968 | Stauffer | 178/7.6 |
| 3,668,409 | 6/1972 | Tuhro | 250/236 |
| 3,573,849 | 4/1971 | Herriot | 350/7 |
| 3,235,660 | 2/1966 | Treseder | 178/7.6 |
| 3,466,451 | 9/1969 | Hanchett | 250/219 CR |
| 3,437,796 | 4/1969 | Lapornik | 178/7.6 |
| 3,284,568 | 11/1966 | Cook | 178/7.6 |
| 3,109,933 | 11/1963 | Bauman | 250/219 CR |
| 3,483,511 | 11/1969 | Rabinow | 178/7.6 |
| 3,370,504 | 2/1968 | Buck | 178/7.6 |
| 3,646,568 | 2/1972 | Woywood | 178/7.6 |

*Primary Examiner*—James W. Lawrence
*Assistant Examiner*—D. C. Nelms
*Attorney*—J. Michael Anglin

[57] ABSTRACT

An optical character scanning system including synchronously scanned illumination and image paths. An operator viewing station is included in the image path and a strobing means is included in the illumination path to allow the operator to directly view a character being scanned by the scanning system. The planes defined by the illumination and image paths form unequal angles with the axis of a rotating polygon mirror used as a deflector. Two illumination sources are placed at equal angles to the mirror axis. Different wavelengths are used for machine scanning and operator viewing.

3 Claims, 1 Drawing Figure

PATENTED JAN 1 1974 3,783,295
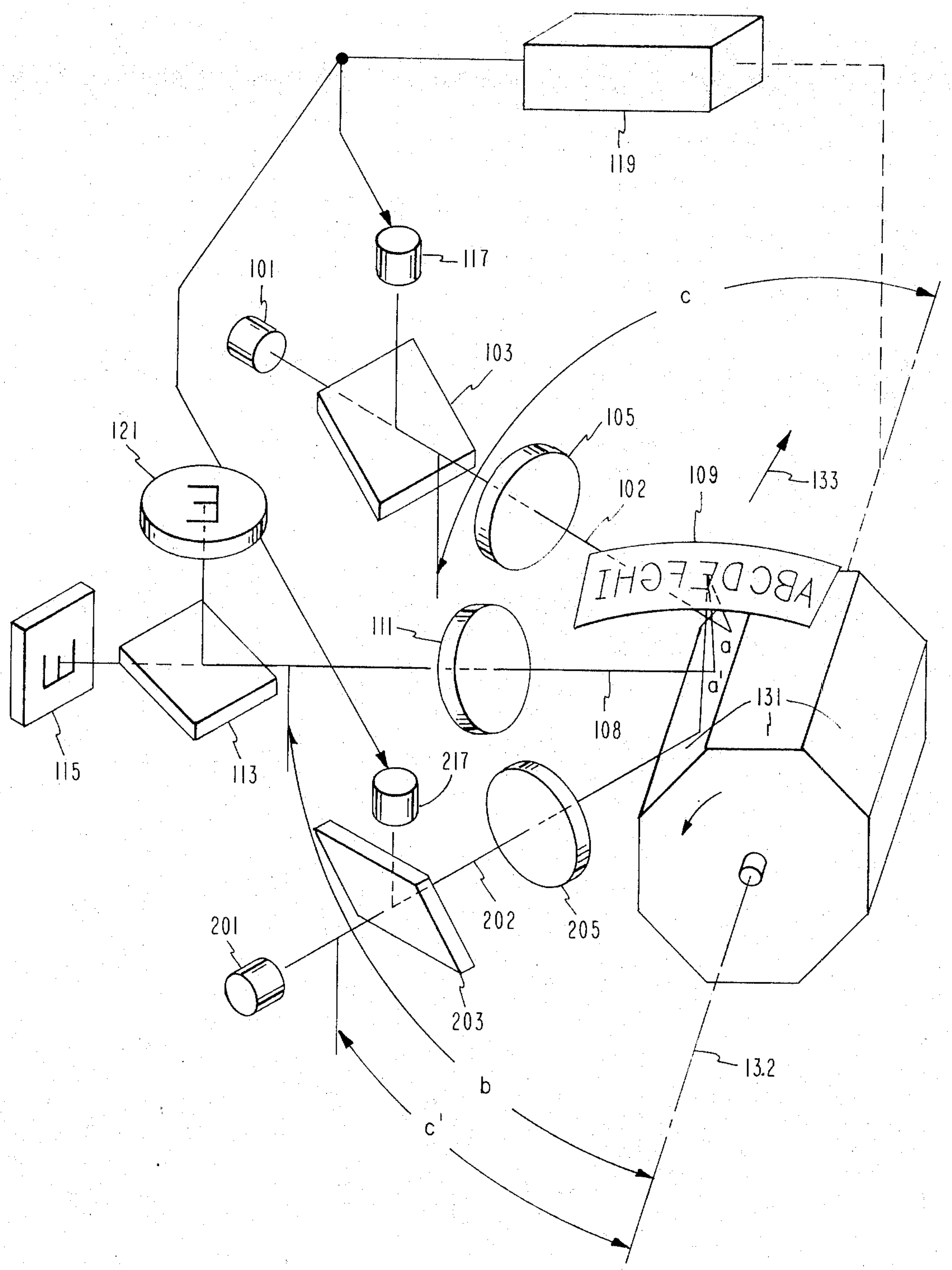
INVENTOR.
DAVID H. CASLER
BY Karl Hesse
AGENT

OPTICAL SCANNING SYSTEM

FIELD OF THE INVENTION

This invention relates to optical character recognition systems in general and more specifically to optical scanning systems for receiving information from an input document.

DESCRIPTION OF THE PRIOR ART

Optical scanning systems are known in the prior art which synchronously illuminate and form an image of selected areas of an input document. These systems utilize specularly reflected light for recognition purposes.

Prior art optical character recognition systems are also known to include operator display stations for displaying a character which may have been detected ambiguously or may require operator action for some other reason. These operator display stations of the prior art are either cathode ray tube displays which receive electronic input from the recognition unit and requires special electronic to optical image conversion means, or they utilize a separate optical path for displaying an optical image taken from the document being read. The use of a separate path is costly and makes optical adjustments of the scanning system difficult without separate adjustment equipment.

It is also known to employ rotating polygon mirrors of various configurations for scanning purposes.

SUMMARY OF THE INVENTION

It is an object of this invention to optically scan a document in an improved manner to obtain increased illumination efficiency and a maximum signal to noise ratio.

It is a further object of this invention to optically scan a character for reading and to display the scanned character for operator action using the same efficient low cost optical scanning apparatus without requiring electronic to optical image conversion.

These and other objects, which will become more apparent upon a reading of the specification, are accomplished by illuminating an area on a document through an optical illumination scanning path arranged so that the incident radiation impinges on the document at a first angle. Reflected illumination is collected from the illuminated area of a document through a synchronously scanned optical imaging path at a reflection angle which is different from the angle of incidence thereby removing specularly reflected radiation from the image to increase the signal to noise ratio. Scanning is performed by a deflector having one or more flat reflective facets which moves cyclically, such as by rotation, about a scan axis parallel to the facets. The scan axis is arranged so that the angle which it forms with the plane of the incident beam is substantially unequal to the angle which it forms with the plane of the imaging path.

A strobe circuit is connected to the scanning means to cyclically strobe the illumination source in synchronism with the motion of the scanning means to illuminate a selected area, of the total area being scanned in any one scan cycle, with visible radiation so that the image of the selected area will appear at an operator viewing station in the image path to the exclusion of images of the remainder of the scanned areas.

DESCRIPTION OF THE DRAWING

The FIGURE shows a preferred embodiment of the invention utilizing a rotating polygon mirror scanning means.

A PREFERRED EMBODIMENT OF THE INVENTION

With reference to FIG. 1, a detailed description of the preferred embodiment of the invention will be set forth. Light source 101, which is driven by a source of power not shown, provides a beam of infrared radiation. The output of source 101 is passed through focusing lens 105 which acts to converge the output of source 101 into a convergent beam of incident radiation 102 which will impinge on an area of document 109. The area of document 109 illuminated by the incident radiation beam 102 will be large enough to include at least one character to be read from the document. Lens 105 is positioned so that its axis lies in a plane which forms a non-zero angle with a line normal to the surface of document 109.

The surface of document 109 will usually have a sufficiently rough texture so that a substantial amount of the incident radiation will be reflected from the document as diffuse radiation at all angles from zero to 90° with respect to the surface of the document. Most of the radiation will, of course, be specularly reflected from the surface of the document. This specularly reflected radiation will leave the document at an angle equal and opposite to the angle at which incident radiation impinged onto the document measured with respect to the surface of the document. For example, as shown in FIG. 1, incident radiation beam 102 falls on the character E at a non-zero angle of $a$ with respect to a line normal to document 109. Specularly reflected radiation is reflected from the document at an angle of $a'$ with respect to the line normal to the document which is equal and opposite to the angle of incidence $a$.

In order to create an image of the character appearing within an illuminated area on the document, a second focusing means in the form of focusing lens 111 is provided along an image path which leaves the surface of document in a direction normal to the surface of document 109. The axis of lens 111 lies in a second plane which also includes lines normal to the surface of document 109. This placement allows the maximum intensity of diffusely reflected light to be collected and focused onto photodetector array 115 for subsequent conversion into electrical signals in preparation for character recognition.

In order that the beam of incident radiation 102 and the beam of diffusely reflected radiation 108 be synchronously scanned across document 109 following a line of characters such as characters "A" through "I" shown in FIG. 1, a cyclically moving scanning means in the form of a continuously rotating polygon mirror 107 is provided. Mirror 107 comprises a plurality of flat reflective facets 131 which are parallel to the scan axis 132 about which the mirror rotates. Mirror 107 simultaneously deflects incident radiation beams 102 and diffusely reflected image radiation beam 108 in order to simultaneously scan both beams across document 109 as mirror 107 rotates. The simultaneous scanning of beams 102 and 108 allows all of the illuminating energy passing through lens 105 to be focused only on that small area of document 109 being imaged upon photodetector array 115 to greatly increase the illumination efficiency. Because of the parallelism between facets 131 and scan axis 132, the inequality of the angles formed by beams 102 and 108 with respect to document 109 signifies that the angle *b*, between the plane of beam 108 and axis 132, is unequal to the angle *c* , between the plane of beam 102 and axis 132. Angle *c'*, on the other hand is equal to angle *c* since angles *a* and *a'* are equal to each other.

A second illumination source 117 having a visible output is provided as shown in FIG. 1. The output radiation of source 117 is directed onto dichroic mirror 103 which is inserted into the path of incident radiation beam 102 at an angle so that the output of source 107 is superimposed on the output of source 101 and contained within incident radiation beam 102.

In a like manner, dichroic mirror 113 is placed in the diffusely reflected image beam 108 at an angle such that the visible light which has been reflected from document 109 appears at a viewing station 121. Viewing station 121 may be in the form of a viewing screen in which case its distance from dichroic mirror 113 would be equal to the distance of photodetector array 115 from dichroic mirror 113 in order that the image of a character would be focused on the viewing screen. An alternate and more efficient form which viewing station 121 could take would be an eyepiece lens such as used in the view finder of a camera.

In order that the image of a single character on document 109 be displayed at viewing station 121 instead of a blurred sequence of all characters, mirror 107 is mechanically connected to a means such as an angle decoder which in FIG. 1 is shown as included within control means 119. The angle decoder will provide a different output signal for each angle assumed by mirror 107 within a finite resolution and will respect the sequence of outputs after each 45° of rotation in view of the fact that mirror 107 has eight facets 131 in this embodiment. Control means 119 responds to a selected one of the output signals provided by the angle decoder to energize source 117 for a brief instant of time, each time the selected signal is received thereby strobing the visible illumination falling upon document 109 which in combination with the rotation of mirror 107 results in a single area, such as that including the letter "E," being illuminated with visible radiation once during each scan.

In order to increase the intensity of illumination on the scanned area of document 109, a second infrared radiation source 201 and a second visible light source 217 has been provided. Source 207, like source 101, is continuously energized, whereas source 217 being connected to the output of strobe control 119 is energized simultaneously with source 117. The outputs of sources 201 and 217 are directed to opposite surfaces of dichroic mirrors 203 which deflects the output of visible source 217 to create a single beam 202 of incident radiation. Incident radiation beam 202 passes through focusing lens 205, is deflected by rotating mirror 107 and strikes document 109 at an angle *a'* which is equal and opposite to the angle *a* of incident beam 102. With this arrangement, specular reflections of incident beam 102 from document 109 will be directed back along incident beam 202 into sources 201 and 217 while specular reflections of beam 202 will be directed back into sources 101 and 117. This arrangement has two advantages. First of all, specular reflections are contained within the source optical systems and therefore are not so apt to reflect off the interior walls of the optical scanning system to cause noise interferences with the diffused light signal received at photosensor array 115. A second advantage is that sources 102 and 202 as well as 117 and 217, will in many cases, contain a parabolic reflector if sources are of the discrete nonsolid state variety. These reflectors will act to return specularly reflected radiation to the document as incident radiation thereby increasing system illumination efficiency.

OPERATION OF THE PREFERRED EMBODIMENT

The detailed operation of the preferred embodiment as shown in FIG. 1 will now be described with respect to an example line of characters such as "A"through "I" shown on document 109. Infrared sources 101 and 201 are continuously energized to provide radiation which passes through dichroic mirrors 103 and 203 to lenses 105 and 205 which convert the incident radiation into converging beams 102 and 202. Beams 102 and 202 are deflected by successive facets 131 of mirror 107, to an area including at least one character on document 109. For the purposes of example, assuming that document 109 is positioned with respect to mirror 107 lens 105 and 205 such that the character "A" is illuminated when polygon mirror 107 has rotated 1°character "B" is illuminated when polygon mirror 107 has rotated 2 degrees and so forth. Inasmuch as lens 111 collects diffusely reflected light from document 109 and focuses this light into a reflected image beam 108 in focus onto photosensor array 115, images of characters "A""B"and so forth will be sequentially focused onto photosensor array 115 which provides electronic output signals representing the focused character images. For the purposes of example, further assume that the fifth character in the line, namely the character "E" resulted in ambiguous electronic signals from photosensor 115 so that a recognition unit attached thereto could not determine the identity of the character. The recognition unit then sends a first signal to inhibit motion of document 109 along the direction of arrow 133 so that it does not move to a new line of characters but remains in the position of the scan resulting in the ambituity. A second signal is sent from the recognition unit to strobe control unit 119 indicating that the fifth character has been ambiguously received. Strobe control unit 119 then acts to provide a short duration output signal to visible light sources 117 and 217 whenever polygon mirror 197 has rotated 5° 50° 95° and so forth thereby allowing sources 117 and 217 to illuminate only the fifth character "E" with visible light, eight times during each revolution of polygon mirror 107. Visible light from the area including the character "E" is diffusely reflected through lens 111 and deflected by dichroic mirror 113 onto viewing screen 121 to allow an operator to observe the character resulting in the ambiguous electronic output from photosensor 115. The operator is then able to make a manual decision as to the identity of the character for manual input into the recognition unit, or if necessary, adjust the optical system to optimize the image focused onto the photosensor array 115.

While the invention has been shown and described with reference to one preferred embodiment, thereof, it will be recognized by those skilled in the art of character recognition, that various changes in form and detail may be made without departing from the spirit and scope of the invention. An example would be to provide the incident radiation from a single achromatic source having a continuous output. The intensity of this continuous output could then be varied by the strobe control unit to obtain a stationary image of a selected character at the viewing station.

What is claimed is:

1. An optical scanning system comprising:

first source means for providing incident radiation of an invisible frequency;

second source means for providing incident radiation of a visible frequency;

first focusing means positioned in the path of said incident radiation, an axis of said first focusing means lying in a first plane, for focusing said incident radiation onto an area of a document thereby illuminating said area;

second focusing means, an axis of said second focusing means lying in a second plane, said second plane forming an angle with respect to the surface of said document which is different from an angle formed between said surface and said first plane, for focusing substantially diffusely reflected radiation from said document onto a detector array thereby forming an image of said area of said document on said detector array;

deflection means interposed between said focusing means and said document and between said second focusing means and said document for simultaneously deflecting said incident and said reflected radiation to cause said illuminated area and the image of said illuminated area to move across said document;

beam splitter means interposed between said deflection means and said detector array to deflect a portion of said reflected radiation to an operator viewing station;

control means connected to said deflection means for activating said second source means in synchronism with said deflection means so that radiation from said source means illuminates only selected areas of said document.

2. The optical scanning system of claim 1 wherein said first focusing means is positioned so that said first plane forms a non-zero angle with respect to a line normal to said document for directing incident radiation upon said document at a non-zero angle with respect to a line normal to the surface of said illuminated area.

3. The optical scanning system of claim 2 wherein said second focusing means is positioned so that said second plane is normal to the surface of said document thereby causing said focusing means to focus diffusely reflected radiation which has been reflected from said document at a direction substantially normal to the surface of said illuminated area.

* * * * *